US011254249B2

(12) United States Patent
Haubrich et al.

(10) Patent No.: US 11,254,249 B2
(45) Date of Patent: Feb. 22, 2022

(54) BACKREST WITH CARRIER MODULE FOR A HEADREST, AND SEAT

(71) Applicant: Adient Engineering and IP GmbH, Burscheid (DE)

(72) Inventors: Jörg Haubrich, Burscheid (DE); Frank Zagromski, Witten (DE); Boris Mrázik, Dubnica nad Váhom (SK); Andrea Mose, Velbert (DE)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 17/179,518

(22) Filed: Feb. 19, 2021

(65) Prior Publication Data

US 2021/0170929 A1  Jun. 10, 2021

Related U.S. Application Data

(63) Continuation-in-part of application No. 16/428,336, filed on May 31, 2019, now Pat. No. 10,946,777.

(30) Foreign Application Priority Data

Jun. 1, 2018  (DE) .................... 10 2018 208 693.1

(51) Int. Cl.
*B60N 2/897* (2018.01)
*B60N 2/809* (2018.01)

(52) U.S. Cl.
CPC ............. *B60N 2/897* (2018.02); *B60N 2/809* (2018.02)

(58) Field of Classification Search
CPC ..... B60N 2/68; B60N 2/897; B60N 2002/899
See application file for complete search history.

(56) References Cited

U.S. PATENT DOCUMENTS

| 4,657,297 | A | 4/1987 | Ishibashi |
|---|---|---|---|
| 2015/0084390 | A1 | 3/2015 | Tanaka et al. |
| 2017/0036579 | A1 | 2/2017 | Line et al. |
| 2017/0210263 | A1* | 7/2017 | Line .................... B60N 2/7094 |
| 2017/0334326 | A1 | 11/2017 | Line et al. |
| 2017/0341554 | A1 | 11/2017 | Mizobata et al. |
| 2017/0361746 | A1 | 12/2017 | Zouzal et al. |
| 2018/0022258 | A1 | 1/2018 | Matsushima |
| 2018/0043802 | A1 | 2/2018 | Brines et al. |
| 2018/0354396 | A1 | 12/2018 | Kuscu et al. |

(Continued)

FOREIGN PATENT DOCUMENTS

| DE | 202011000363 U1 | 8/2011 |
|---|---|---|
| DE | 102014219166 A1 | 3/2016 |

(Continued)

*Primary Examiner* — Timothy J Brindley
(74) *Attorney, Agent, or Firm* — Marshall & Melhorn, LLC

(57) ABSTRACT

A backrest may have a seat back structure and a carrier module for a headrest. The carrier module may have at least one carrier element arranged on an upper portion of the seat back structure and fixedly connected to the seat back structure. The carrier module may also have at least one supporting element adapted to support the carrier element. The at least one carrier element may have a receiving space configured to receive the headrest and a fixing structure projected towards into the receiving space and adapted to detachably fasten the supporting element to the carrier element. The backrest may be used with a seat.

24 Claims, 10 Drawing Sheets

(56) References Cited

U.S. PATENT DOCUMENTS

| | | |
|---|---|---|
| 2019/0152370 A1 | 5/2019 | Palmieri et al. |
| 2019/0381919 A1 | 12/2019 | Fredriksson et al. |
| 2020/0079259 A1 | 3/2020 | Shinohara et al. |
| 2020/0079263 A1 | 3/2020 | Suarez et al. |
| 2021/0101511 A1* | 4/2021 | Berry .................. B60N 2/6009 |

FOREIGN PATENT DOCUMENTS

| | | |
|---|---|---|
| DE | 102017100235 A1 | 7/2017 |
| DE | 102018100039 A1 | 7/2018 |
| EP | 1524147 A2 | 4/2005 |
| EP | 2783910 A1 | 10/2014 |
| WO | 2018129030 A1 | 7/2018 |

\* cited by examiner

BACKREST WITH CARRIER MODULE FOR A HEADREST, AND SEAT

CROSS REFERENCE TO RELATED APPLICATIONS

This application claims the benefit of priority under 35 U.S.C. § 119 of German Application 10 2018 208 693.1, filed Jun. 1, 2018, the entire contents of which are incorporated herein by reference.

TECHNICAL FIELD

The invention relates to a backrest having a carrier module for a headrest, and to a seat, in particular vehicle seat.

TECHNICAL BACKGROUND

In the prior art, vehicle seats with headrests are known in which the headrests are held by means of headrest rods in a seat back structure of the vehicle seat. A headrest is known for example from EP 2 783 910 A1.

For example, from DE 10 2017 100 235 A1, a backrest with a headrest is known in which the headrest is arranged in a receptacle of a movable backrest portion.

SUMMARY

It is an object of the present invention to specify a backrest which is improved in relation to the prior art and which has a carrier module for a headrest, and an improved seat, in particular vehicle seat.

A carrier module for a headrest of a seat, in particular of a vehicle seat, comprises at least one carrier element which has at least one receiving structure and/or a receiving space for receiving the headrest. Furthermore, the carrier module comprises at least one covering which surrounds the receiving space and/or the receiving structure at least in certain portions. For example, the carrier module is arranged on an upper portion of a seat back structure of the seat. For example, the carrier module is arrangeable on an existing seat back structure of a conventional seat. In particular, the headrest is insertable into the receiving space and/or into the receiving structure. For example, the covering is a rear-side and/or front-side covering of the receiving space and/or of the receiving structure.

The advantages achieved by means of the invention consist in particular in that a carrier module for a headrest is created which is in particular of robust form. Holding and fixing of the headrest are thus improved. Furthermore, the carrier module exhibits high stiffness in relation to conventional carrier modules such as headrest rod holders. In particular, by means of the receiving structure and/or the receiving space, a region for holding headrest rods is protected against external influences and dirt.

Here, the headrest is received in the receiving structure and/or in the receiving space such that, in particular, a lower headrest and rod region is surrounded by the receiving structure. By means of the receiving structure, the headrest is robustly supported during use of the seat, in particular sports/vehicle seat. In particular, the headrest is inserted into the receiving structure and/or into the receiving space such that an excessive deflection of the headrest, for example in the event of an accident or during high-speed driving, is avoided. Furthermore, support and safety of an occupant, in particular of a head, neck and shoulder region of the occupant, are increased.

Furthermore, the receiving structure is for example configured for receiving headrest rods. The receiving space is configured to at least partially receive a headrest cushion.

In one refinement of the carrier module, the covering comprises a contour region which surrounds the receiving structure and/or the receiving space. In particular, the receiving structure and/or the receiving space are/is enclosed at least in certain portions by the contour region. For example, the contour region is formed as a rear-side covering of the receiving structure and/or of the receiving space. Additionally or optionally, the contour region is configured to laterally cover the receiving space and/or the receiving structure. The contour region is for example of wall-like, plate-like, partially arcuate and/or shell-like form.

In a further embodiment, the contour region is of substantially U-shaped or C-shaped form. For example, the contour region is formed in the manner of a collar. In particular, the contour region is of substantially arcuate form. Here, the contour region surrounds the receiving space and/or the receiving structure at least in certain portions.

For example, the contour region is a decorative element. The vehicle seat is for example designed as a sports seat. Here, by means of the contour region, it is possible for a region of attachment of the headrest to the seat back to be shaped in an ergonomic manner. Furthermore, by means of the contour region, a homogeneous transition to the seat back is made possible.

Furthermore, the carrier module is adaptable to individually configured seat back structures. In particular, it is possible for different shapes and contours for the attachment to the upper seat back region to be formed.

The covering comprises at least one covering element. For example, the covering element is formed as a front-side covering of the receiving structure and/or of the receiving space. In particular, the covering element is of wall-like, plate-like, partially arcuate and/or shell-like form. Here, the covering element is a decorative element, which is provided for covering and visually enhancing the front side.

In a further refinement, the contour region for covering the receiving structure and/or the receiving space at the rear side is formed so as to be longer in a vertical direction than the covering element. In this way, rear-side support of the headrest, for example in the event of an accident, is made possible.

A further embodiment of the carrier module provides that the receiving structure and/or the receiving space are/is formed by a depression formed in the carrier element. In particular, the depression has the receiving space for receiving the headrest, in particular the headrest cushion thereof. The depression is open in an upward direction. For example, the depression is formed by a carrier element of substantially trough-like or U-shaped form. Formed in the base region of the depression is the receiving structure for receiving the headrest, in particular the headrest rods thereof. For example, the base region comprises recesses or openings for receiving the headrest rods.

One possible development of the carrier module provides for the receiving space to be formed so as to be open at least on a side facing towards an occupant. For example, the contour region has an open side. In this way, the receiving space is formed so as to be open at least in certain portions. The front-side covering element is arranged in the region of the open side of the receiving space. Furthermore, the headrest cushion is, on the open side, exposed in order to support and in order to protect a head of the occupant. Here, a rear side of the headrest is surrounded by the contour region. Here, the contour region projects beyond the receiving structure at the rear side. In this way, the headrest is supported with respect to force action directions in a longitudinal direction of the vehicle, for example during driving, high-speed driving and in the event of an accident or collision. In particular, crash safety is increased.

In an optional or alternative development, the receiving structure comprises receiving openings which correspond with rod receptacles which are formed in the seat back structure. The seat back structure is for example a frame structure which has rod receptacles in the upper portion.

In a further embodiment, the receiving structure is fastened to the seat back structure. For example, the carrier element of the carrier module and the seat back structure are connected to one another by a material bond, by a force fit and/or by a form fit. For example, the carrier element is welded to the seat back structure. Alternatively, the carrier element and the seat back structure are detachably connected to one another. For example, the carrier element may be fastened to the seat back structure by means of detachable fastening elements. Here, detachable clip, rivet, screw, hook and/or other detent elements are for example provided on the carrier element. Fastening elements corresponding with the fastening elements of the carrier element may be integrally formed on and/or attached to the seat back structure.

The carrier module may furthermore be preassembled and may for example form a separate installation module. The preassembled carrier module with carrier element, comprising a receiving space and/or a receiving structure and a cover which surrounds the receiving space or the receiving structure at least in certain portions, permits simple and quick installation of the headrest on the seat back.

A further embodiment provides for the contour region to comprise at least two contour portions which project from the receiving structure. The at least two contour portions are in particular formed so as to be spaced apart from one another and arranged laterally with respect to the receiving structure. In particular, the contour portions are arranged so as to be spaced apart from one another in a transverse direction of the carrier element, that is to say in a transverse direction of the seat back structure.

In a further embodiment, upwardly bent contour portions are arranged in the base region of the carrier element. Alternatively or in addition, the contour portions are connected to the receiving structure by a material bond, by a force fit and/or by a form fit in order to form the receiving space.

Optionally, the carrier element, comprising the receiving structure and the contour region for covering the receiving structure, is formed as a single piece, in particular in the form of an injection-moulded part. The contour portions project in particular upwards, that is to say they project from the receiving structure in a vertical direction. For example, the contour portions project from the receiving structure substantially at right angles. The contour portions are for example oriented so as to run parallel to one another. For example, the carrier element may be of U-shaped form. In particular, a receptacle, in particular the receiving space, is formed by a spacing between two contour portions, which are situated opposite one another in a longitudinal and/or transverse direction, for the headrest.

In one development of the carrier module, the receiving structure comprises a rear-side contour portion which connects the lateral contour portions to one another. The rear-side contour portion is arranged on a side of the seat back structure which is averted from the occupant. Here, the rear-side contour portion forms a rear-side covering of the receiving space. In particular, the contour portions are formed as a single piece, in particular coherently. Here, the contour portions are arranged so as to surround the receiving structure and are connected to the latter. In particular, the carrier element is of substantially trough-like and/or collar-like form with an open side.

In one possible development, the contour portions are formed so as to be of different heights. Alternatively, all of the contour portions, that is to say the rear-side contour portion and the lateral contour portions, may be of substantially equal height. Here, the inserted headrest is protected both at the rear and at the sides from acting forces and external influences. In particular, a holding action of the headrest and thus support of a head, neck and shoulder region of the occupant are increased. For example, the contour portions project in a vertical direction from the bottom side substantially up to half of the extent of the headrest. That is to say, a height of the respective lateral contour portion corresponds to half of a height of the headrest. Alternatively, the lateral contour portions may be of heights equal to that of the headrest and may be adapted in homogeneous fashion to a shape of a seat back structure.

Within the receiving structure, a spacing may be provided or formed in each case between the contour portions and the headrest. In this way, a clearance or flexibility, in particular for inclination and/or tilt adjustment, of the headrest is made possible. Furthermore, material friction between the contour portions and the headrest is substantially avoided. Alternatively, the headrest is insertable into the receiving structure with a form fit.

A further embodiment provides for the lateral contour portions to each be formed so as to be taller than the rear-side contour portion. Here, an inclination adjustability and/or tiltability of the headrest rearward in order to increase comfort is made possible. Furthermore, a visual appearance of the seat back with a carrier element of said type is improved. For example, an upper edge contour of the contour region is of undulating design. In particular, the contour portions have an ergonomic shape. Furthermore, a seat back structure can remain unchanged and does not need to be shaped ergonomically in an upward direction.

In a further possible embodiment, the lateral contour portions are formed so as to taper substantially conically towards one another. For example, the lateral contour portions are oriented substantially at an acute angle with respect to the receiving structure. For example, the contour portions have a smaller spacing, in particular width spacing, to one another in an upper portion region than in a lower portion region. For example, the spacing, in particular width spacing, in the lower portion region corresponds to a width of the upper portion of the seat back structure. That is to say, the lateral contour portions approach one another in an upward direction.

In other words: the upper portion region has a greater vertical spacing to the base region of the carrier element, in particular to the receiving structure thereof. The lower portion region has little to no vertical spacing to the base region, in particular to the receiving structure of the carrier element. In particular, dimensions of the receiving structure correspond to dimensions of the upper portion of the seat back structure. In this way, a uniform transition between seat back structure and carrier element is achievable.

Furthermore, an upper headrest region of the headrest may be arranged between the upper portion regions, which are spaced apart from one another to a lesser extent, of the contour portions. Here, the upper headrest region is arranged between said contour portions so as to be substantially fixed with respect to displacement and/or slippage. In the lower portion region, the headrest may for example be arranged so as to be spaced apart from the respective lateral contour portions. Here, temperature control of, such as for example air circulation and/or a supply of air to, the head, neck and shoulder region of the occupant is made possible.

In a further embodiment, inner sides, that is to say side surfaces facing towards the headrest, of the lateral contour portions run parallel to one another. In particular, the inner sides or inner side surfaces are formed so as to be substantially perpendicular to the receiving structure. For example, the contour region has an internal spacing between the lateral contour portions which remains substantially constant from bottom to top. Outer sides, that is to say outer side surfaces averted from the headrest, in particular side surfaces, which are directed into a vehicle 20 interior space, of the respective lateral contour portions, are of inclined or oblique form, for example are formed so as to taper conically toward one another. For example, the contour region has an outer spacing which varies from bottom to top. In particular, the receiving space is formed in the carrier element by the spacing between the lateral contour portions.

In a further possible refinement of the carrier module, at least one supporting element is provided. The covering element and/or the supporting element are/is arranged in the region of the open side of the carrier element. In particular, the covering element and/or the supporting element are/is arranged in the lower region of the contour region, in particular between the contour portions.

Furthermore, the covering element and/or the supporting element are/is each of substantially U-shaped or C-shaped form. For example, an additional head, neck and/or shoulder support for the occupant is formed by means of the covering element and/or supporting element. Furthermore, the covering element and/or the supporting element is provided for the fixing and support of the contour region, in particular of lateral, mutually spaced-apart contour portions of the carrier element. In particular, the covering element is shaped, and formed from materials, such that a throat/neck region of the occupant is protected, in particular is supported in a comfortable and pleasant manner. For this purpose, the covering element and/or the supporting element may be formed from plastic and coated with a coating, for example lacquer or cushion layer. For example, the covering element has a lower covering side which covers the receiving structure. In particular, the receiving structure is, on the open side facing toward the occupant, protected against external influences by means of the covering element. Furthermore, the covering element has a shape which corresponds at least in certain portions to a shape of the carrier element, in particular of the contour region thereof. For example, the covering element comprises lateral covering sides which correspond with the lateral contour portions.

The supporting element is configured for reinforcing the contour portions. Furthermore, the supporting element is provided for supporting the receiving structure and/or the receiving space. For example, the supporting element is formed so as to be integrated in the carrier element. Here, the supporting element may comprise supporting ribs. For example, the supporting element may be arranged in the region of the receiving structure and/or of the contour region. Alternatively or in addition, the carrier element is equipped with a separate supporting element. For example, the supporting element comprises a lower supporting side for reinforcing the receiving structure. Here, the lower supporting side has dimensions which correspond to dimensions of the receiving structure. Optionally or in addition, the supporting element comprises lateral supporting sides which correspond for example to the lateral contour portions. That is to say, the supporting element has a shape which corresponds at least in certain portions to a shape of the carrier element, in particular of the contour region thereof. For example, the supporting element, after the fastening of the carrier element to the seat back structure, is fastened to the latter. Subsequently, the covering element is arranged on the supporting element and is fastened to the latter and optionally to the carrier element.

In one development, the covering element and the supporting element may be 20 formed as a single piece and have a shape which corresponds to a shape of the contour portions of the carrier element. For example, a side facing towards the carrier element is configured in particular for supporting and reinforcing the carrier element. A side averted from the carrier element and facing towards the occupant is formed so as to be visually appealing and comfortable for the occupant.

In a further embodiment of the carrier module, the covering element and/or supporting element are/is arranged at least in certain portions in the receiving structure and detachably fixed to the carrier element. In particular, the covering element and/or the supporting element are/is connected to the receiving structure by a form fit and/or by a force fit. For example, the supporting element is fastened to the carrier element by means of detachable fastening elements, such as for example detent, hook, clamping and/or clip elements. The covering element is fastened to the supporting element and additionally or optionally to the carrier element by means of detachable fastening elements, such as for example detent, hook, clamping and/or clip elements.

In one possible development of the carrier module, the carrier element is formed at least in certain portions from plastic, for example polypropylene (PP), in particular expanded/expandable polypropylene (EPP). The carrier module, in particular a shape and configuration of the carrier module, may be produced as an individually adapted injection-molded part in a manner dependent on manufacturer and customer demands. In particular, the carrier element, which is formed from plastic, in particular so-called EPP, comprises soft elastic to semi-hard characteristics, which are suitable for supporting the head, neck and shoulder regions of the occupant. For example, the carrier element is formed from thermoplastic synthetic foam. This particle foam is distinguished by very good mechanical characteristics. At the same time, a high degree of design freedom of shapes of the carrier element is made possible. For example, the carrier element is formed by means of a primary forming process, such as for example injection molding. Here, it is possible for different carrier elements to be formed in a manner dependent on the seat back structure and manufacturer and customer demands.

A further embodiment describes a headrest arrangement, in particular for a seat for vehicles. This headrest arrangement comprises at least one headrest with two headrest bars 10 which are parallel to and spaced apart from one another. Furthermore, the headrest arrangement comprises a carrier module with a carrier element which has at least one receiving structure and/or a receiving space for receiving the headrest. Furthermore, the carrier element comprises at least one covering which surrounds the receiving space and/or the receiving structure at least in certain portions. In the case of such a headrest arrangement, during driving, in particular high-speed driving, it is for example the case that a generation of noise is reduced owing to a secure fixing of the headrest bars in the receiving structure and/or of the headrest in the receiving space.

A further possible embodiment describes a seat, in particular a vehicle seat. The seat comprises a seat back structure, for example in the form of a frame, and a headrest 20 arrangement arranged on the seat back structure. In particular, the headrest arrangement is held on the seat back structure.

In one refinement, a shape of the covering element corresponds in particular to a shape of the seat back structure and/or of the headrest. For example, the covering element is arranged in the region of the receiving structure, which is provided for receiving headrest bars, and in the region of the seat back structure. In particular, a uniform transition between the headrest arrangement and the seat back structure is made possible.

The seat can in particular be of ergonomic form in the head, neck and shoulder region of the occupant. In particular, the seat is a sports seat of a sports vehicle. Furthermore, varied and complex shapes are realizable, for example in order to improve a sporty visual appearance of the seat back structure, by means of the headrest arrangement for the headrest.

Exemplary embodiments of the invention will be discussed in more detail on the basis of drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
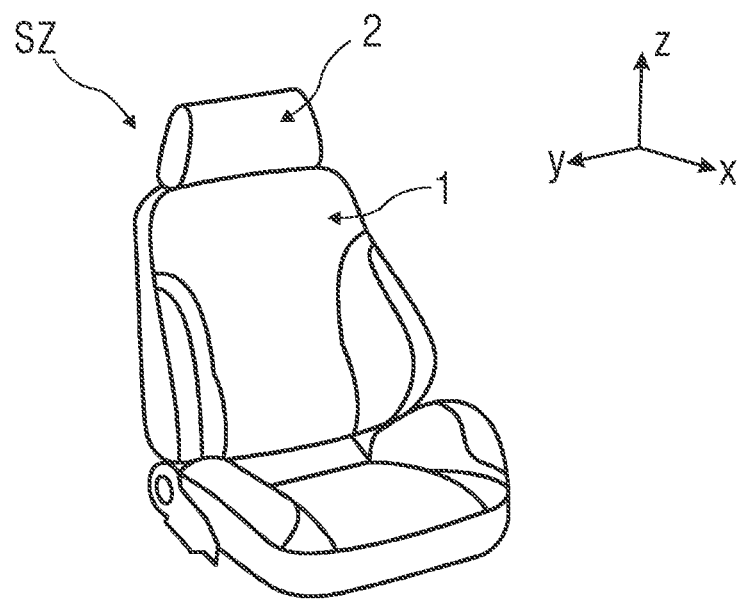
FIG. 1 is a schematic perspective view showing a seat, in particular vehicle seat.

Referring to the drawings, parts which correspond to one another are denoted by the same reference designations in all figures.

FIG. 1 schematically shows a seat SZ, in particular vehicle seat, in a perspective illustration. Here, the seat SZ is for example a sports seat of a sports vehicle. The seat SZ comprises a backrest 1 with a headrest 2.

Here, the arrangement of the seat SZ in the vehicle defines the coordinate system used below, comprising a vertical axis z, a longitudinal axis x and a transverse axis y, wherein the vertical axis z is oriented parallel to the vehicle vertical orientation or Z direction, the longitudinal axis x is oriented parallel to the vehicle longitudinal orientation or X direction, and the transverse axis y is oriented parallel to the vehicle transverse orientation or Y direction.

Figure 2:
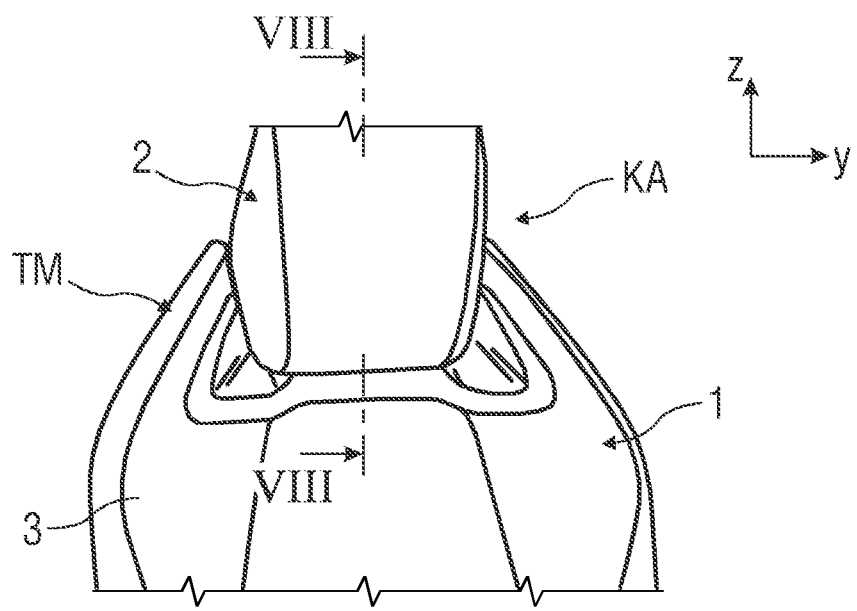
FIG. 2 is a schematic front view of an exemplary embodiment of a headrest arrangement installed on a backrest of the seat.

FIG. 2 schematically shows a front view of an exemplary embodiment of a headrest arrangement KA installed on the backrest 1 of the seat SZ. In particular, the backrest 1 and the headrest arrangement KA are equipped with a lining 3. In this way, a uniform visual backrest surface for an occupant (not illustrated in any more detail), in particular in the head, neck and shoulder region of the occupant, is formed.

The headrest arrangement KA comprises a carrier module TM. Here, the carrier module TM has an upwardly substantially conical tapering shape. In particular, the carrier module TM is provided for holding the headrest 2 on the backrest 1.

FIGS. 3A to 3E schematically show an exemplary embodiment of the carrier module TM for the headrest 2 in different assembly steps M1 to M5, in each case in a perspective illustration. The carrier module TM comprises a carrier element 4 for receiving the headrest 2.

Figure 3A:
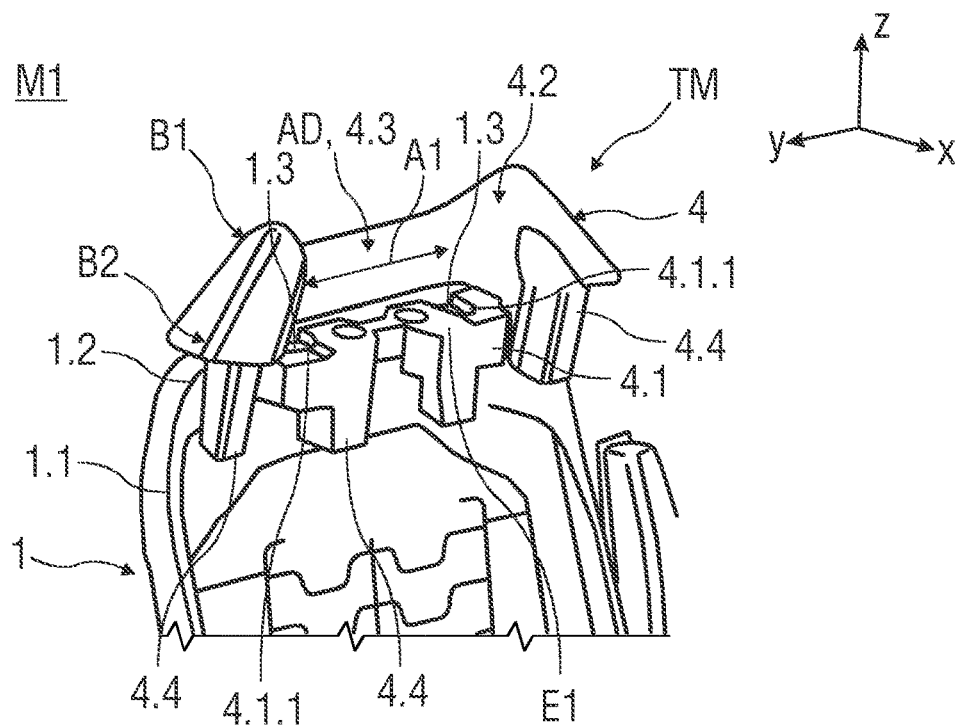
FIG. 3A is a schematic perspective view showing an exemplary embodiment of 5 a carrier module for a headrest in one of different assembly steps.

FIG. 3A shows a seat back structure 1.1 of the backrest 1. In particular, the seat back structure 1.1 is in the form of a frame. The carrier element 4 is, in a first assembly step M1 shown in FIG. 3A, arranged on an upper portion 1.2 of the seat back structure 1.1. The upper portion 1.2 is for example a transverse frame of the seat back structure 1.1. The carrier element 4 is fastened to the seat back structure 1.1 in a manner not illustrated in any more detail, for example by means of screws, bolts, rivets and/or clip elements, hook elements. Alternatively, the carrier element 4 may be fastened to the seat back structure 1.1 by being welded to the latter.

The upper portion 1.2 of the seat back structure 1.1 comprises two receiving openings 1.3 for receiving headrest rods (not illustrated in any more detail).

The carrier element 4 comprises a receiving structure 4.1, which is arranged on the upper portion 1.2. The receiving structure 4.1 is formed in particular as a bottom side of the carrier element 4. The receiving structure 4.1 is formed for example from plastic, for example polypropylene (PP), in particular expanded/expandable polypropylene (EPP).

Furthermore, the receiving structure 4.1 comprises two receiving openings 4.1.1. The receiving openings 4.1.1 are provided for receiving/holding the headrest rods. In particular, the receiving openings 4.1.1 correspond to the receiving openings 1.3 of the seat back structure 1.1.

The headrest rods can subsequently be inserted into the respective receiving openings 1.3, 4.1.1.

The carrier element 4 has a receiving space 4.2 for receiving the headrest 2, in particular the headrest pad thereof. For example, the carrier element 4 is formed as an injection-molded part. In this way, the receiving space 4.2 is producible in a small number of method steps.

The carrier element 4 comprises a covering AD which surrounds the receiving space 4.2 and the receiving structure 4.1 in certain portions. In particular, the covering AD comprises a contour region 4.3 which is provided for forming the receiving space 4.2.

In particular, the receiving space 4.2 and the receiving structure 4.1 are formed for example in the manner of a depression in the carrier element 4. Here, the contour region 4.3 surrounds the receiving structure 4.1 and the receiving space 4.2. The contour region 4.3 encloses at least two sides 4.2.1 of the receiving space 4.2 and of the receiving structure 4.1. In the exemplary embodiment illustrated, the contour region 4.3 encloses three sides 4.2.1, 4.2.2 of the receiving space 4.2 and of the receiving structure 4.1. Here, two sides 4.2.1 are sides 4.2.1 of the carrier element 4 which are oriented in a transverse direction, and a further side 4.2.2 forms a rear side of the carrier element 4.

For example, the receiving structure 4.1 forms a bottom surface in the base region of the carrier element 4, wherein the contour region 4.3 surrounds the receiving structure 4.1. In particular, the contour region 4.3 projects from the receiving structure 4.1. Here, the contour region 4.3 projects upward from the seat back structure 1.1.

To form the receiving space 4.2, the contour region 4.3 is in particular of U-shaped or C-shaped form. In particular, the contour region 4.3 forms a type of collar. For example, the carrier element 4 is formed so as to be open on a side 4.2.3 facing toward the occupant. In particular, the contour region 4.3 is formed such that the side 4.2.3 is exposed.

The contour region 4.3 is formed for example from plastic, for example polypropylene (PP), in particular expanded/expandable polypropylene (EPP). In particular, the carrier element 4 is an injection-molded part, wherein the contour region 4.3 is formed as a single piece.

Figure 3B:
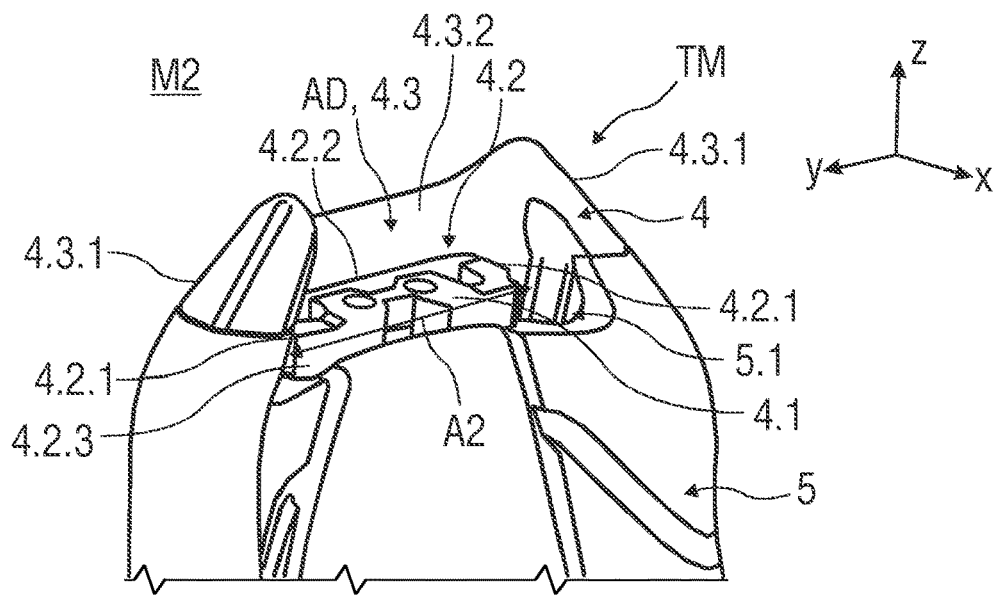
FIG. 3B is a schematic perspective view showing an exemplary embodiment of a carrier module for a headrest in another of different assembly steps.

FIG. 3B shows a further assembly step M2. After the attachment of the carrier element 4, the seat back structure 1.1 is equipped with a cushion element 5, for example a foam element. As illustrated in FIG. 3A, the carrier element 4 may comprise extension portions 4.4.

The extension portions 4.4 project downwards from a receiving structure plane E1. For example, the extension portions 4.4 are connected both to the receiving structure 4.1 and to the contour region 4.3. For example, the extension portions 4.4 are provided for receiving the headrest rods. Furthermore, the extension portions 4.4 are for example provided for the connection of the carrier element 4 to the pad element 5. Here, the carrier element 4, in particular the contour region 4.3 thereof, is perceivable as an extension of the seat back structure 1.1 in a vertical direction. In particular, the cushion element 5 encloses the carrier element 4 at the seat back side and thus forms a homogeneous, in particular visually uniform transition.

In particular, the contour region 4.3 comprises a number of contour portions 4.3.1, 4.3.2. The contour region 4.3 comprises two lateral contour portions 4.3.1, that is to say contour portions 4.3.1 arranged in a transverse direction of the seat back structure 1.1. Furthermore, the contour region 4.3 comprises a contour portion 4.3.2 formed at the rear side.

In particular, the contour portions 4.3.1, 4.3.2 are formed so as to be of different heights. For example, the laterally arranged contour portions 4.3.1 are formed so as to be taller than the rear-side contour portion 4.3.2. In the exemplary embodiments illustrated, the lateral, mutually oppositely situated contour portions 4.3.1 are formed so as to taper substantially conically towards one another.

In particular, the contour portions 4.3.1 have a smaller spacing A1, in particular width spacing, to one another in an upper portion region B1 than in a lower portion region B2. That is to say, the contour portions 4.3.1 are spaced apart from one another with a greater spacing A2, in particular width spacing, in the lower portion region B2.

Figure 3C:
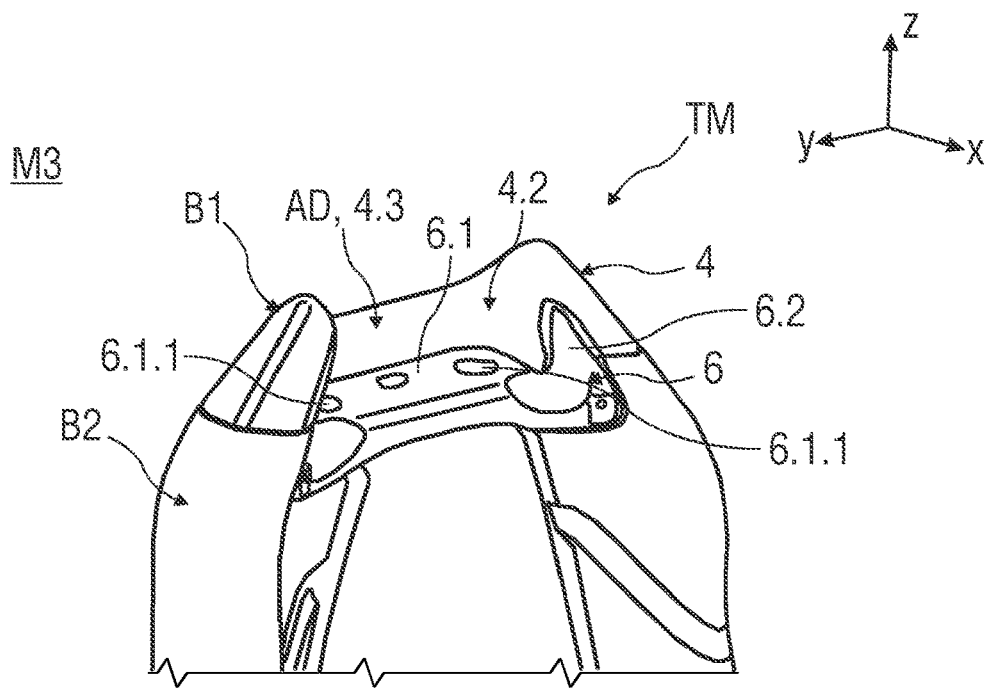
FIG. 3C is a schematic perspective view showing an exemplary embodiment of a carrier module for a headrest in another of different assembly steps.

FIG. 3C shows a further assembly step M3 of the carrier module TM. For the reinforcement of the receiving structure 4.1 and/or of the receiving module 4.2 and of the contour region 4.3, the carrier element 4 is equipped with a supporting element 6. The supporting element 6 is arranged in the region of the open side 4.2.3 and in the lower portion region B2 of the carrier element 4. Here, the cushion element 5 is formed such that the receiving structure 4.1 is at least partially recessed or exposed.

In particular, the supporting element 6 is arranged in an aperture 5.1 formed in the cushion element 5. Here, the supporting element 6 covers visible regions of the receiving structure 4.1. The supporting element 6 is of substantially U-shaped form. Here, the supporting element 6 comprises a lower supporting side 6.1, which covers the receiving structure 4.1 and reinforces the latter for the receiving of the headrest 2. Here, the lower supporting side 6.1 has openings 6.1.1 which correspond to the receiving openings 4.1.1 and in which headrest rods are arrangeable. Furthermore, the supporting element 6 comprises lateral supporting sides 6.2 which project upwards from the lower supporting side 6.1.

In particular, a shape of the lateral supporting sides 6.2 corresponds to a shape of the lateral contour portions 4.3.1 of the carrier element 4. For example, the supporting element 6 is formed from plastic, metal and/or from some other substantially robust material. In one development, the supporting element 6 may be an injection-molded part.

Figure 3D:
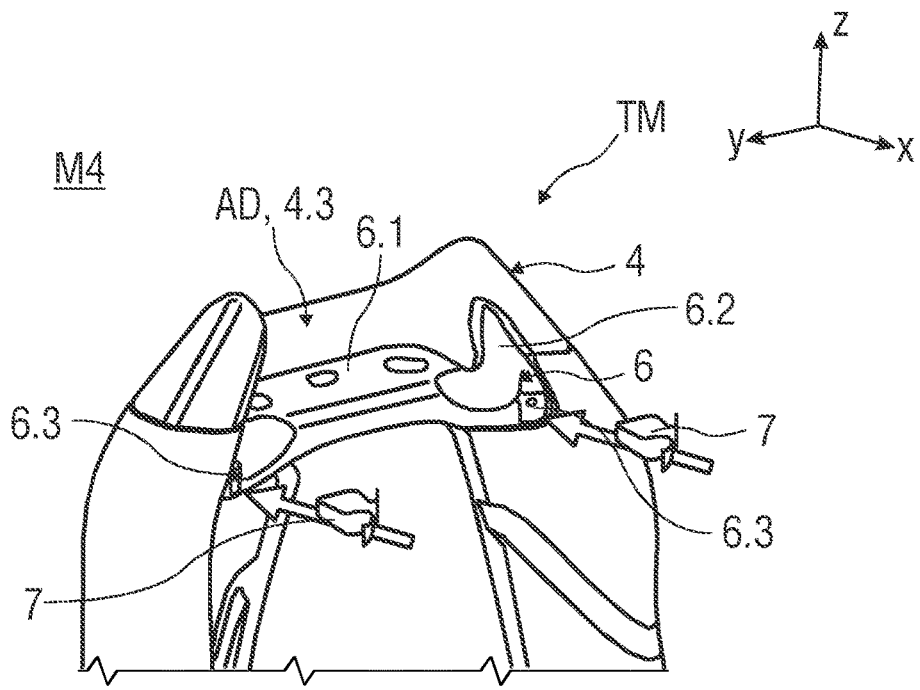
FIG. 3D is a schematic perspective view showing an exemplary embodiment of a carrier module for a headrest in another of different assembly steps.
Figure 3E:
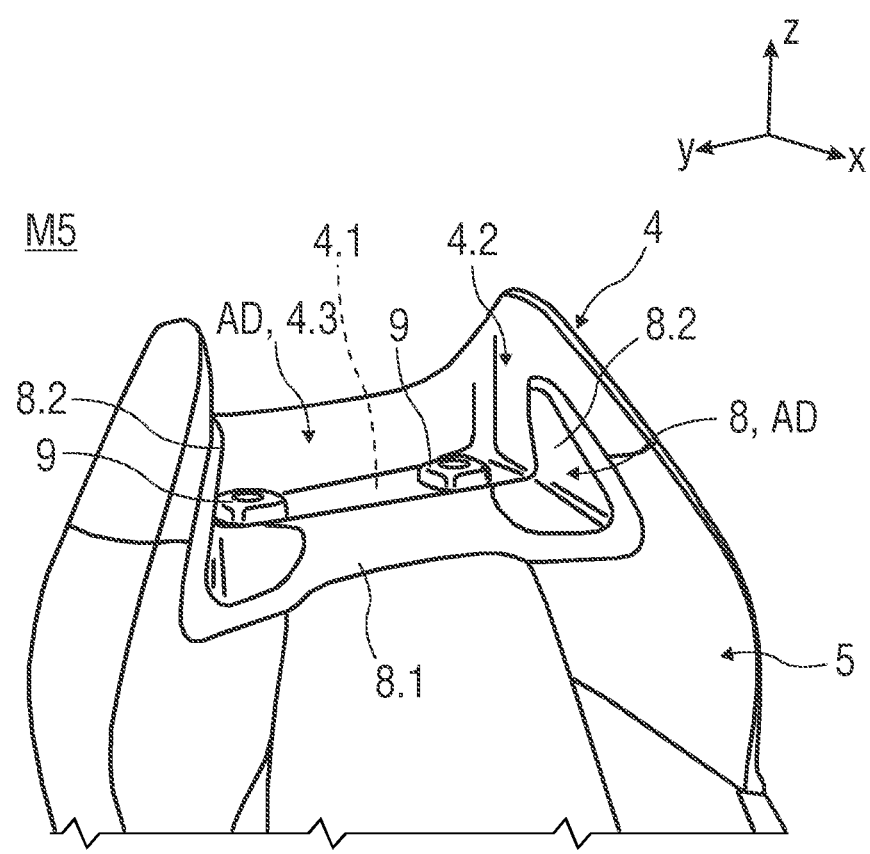
FIG. 3E is a schematic perspective view showing an exemplary embodiment of a carrier module for a headrest in another of different assembly steps.

FIGS. 3D and 3E each show a further assembly step M4, M5 of the carrier module TM. The supporting element 6 has in each case one or more fastening points 6.3 in the region of the lateral supporting sides 6.2. It is for example possible for detachable fastening elements 7 to be arranged at these fastening points 6.3. For example, the detachable fastening elements 7 are hook, detent and/or clip elements.

To cover the supporting element 6 and for example to improve a visual appearance of the carrier module TM, a covering element 8 shown in FIG. 3E may be fastened to the supporting element 6. In particular, the covering element 8 is arrested on the supporting element 6 by means of the detachable fastening elements 7.

In one development, the carrier module TM comprises a further covering AD, which surrounds the receiving space 4.2 and the receiving structure 4.1 in certain portions. Here, the covering AD comprises the covering element 8. In this refinement, the covering element 8 is arranged directly on, and fastened to, the carrier element 4. For example, the carrier element 4 comprises integrated supporting elements 6 such as supporting ribs.

The covering element 8 is for example a decorative element. Here, the covering element 8 may be formed from plastic and/or metal. In one development, the covering element 8 is an injection-molded part. For example, the covering element 8 is coated with a coating, for example a lacquer. In particular, the covering element 8 is of substantially U-shaped form. Here, the covering element 8 comprises a lower covering side 8.1, which covers the supporting element 6 and/or the carrier element 4. Furthermore, the covering element 8 comprises laterally upwardly bent covering sides 8.2.

The lateral covering sides 8.2 cover the lateral supporting sides 6.2 and/or the contour portions 4.3.1 of the carrier element 4. In particular, a shape of the covering element 8 corresponds to a shape of the supporting element 6 and/or of the contour portions 4.3.1. Furthermore, rod sleeves 9 for the positioning of headrest rods may be arranged in the receiving structure 4.1.

Figure 4:
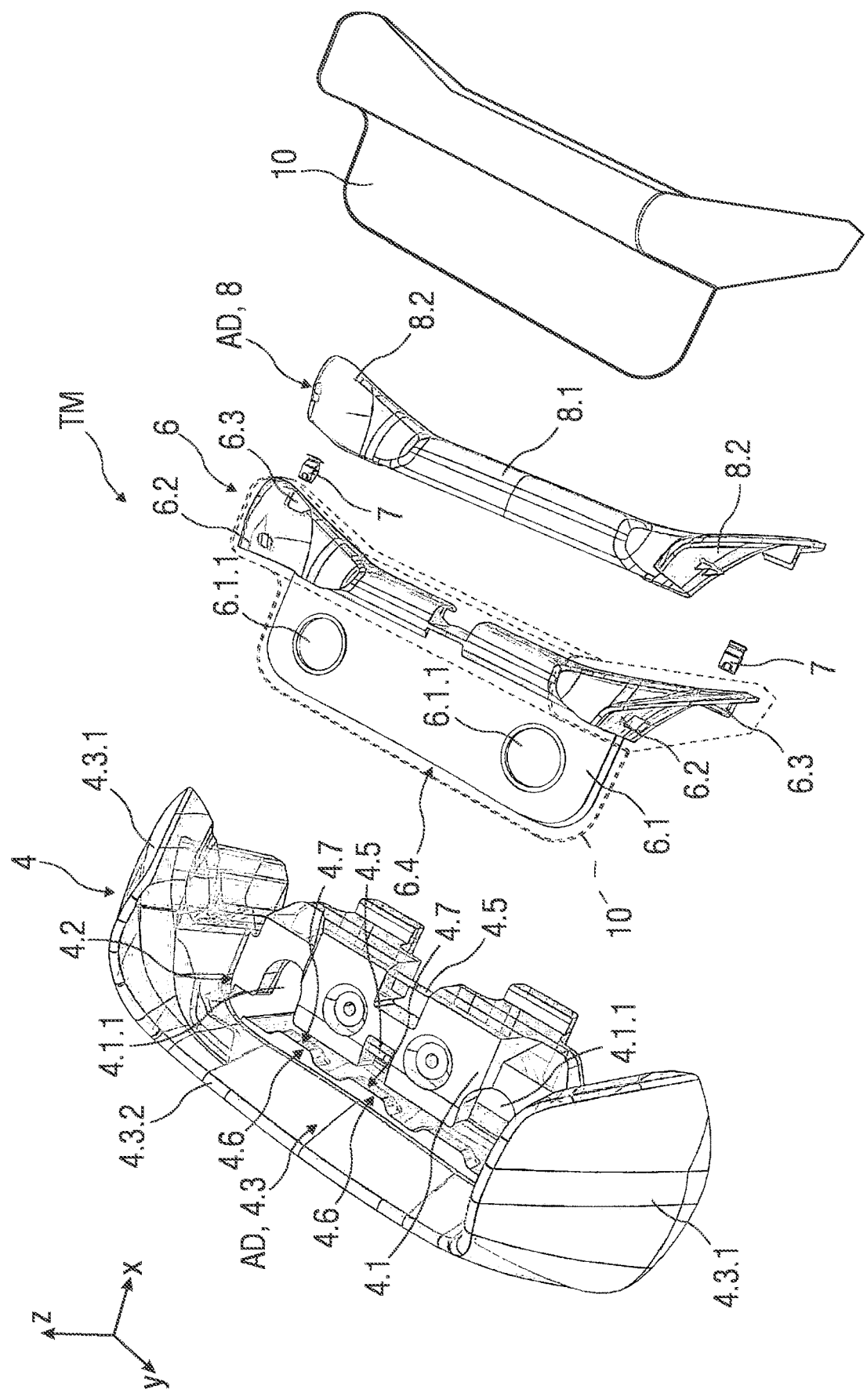
FIG. 4 is a schematic perspective exploded illustration of the carrier module.
Figure 5A:
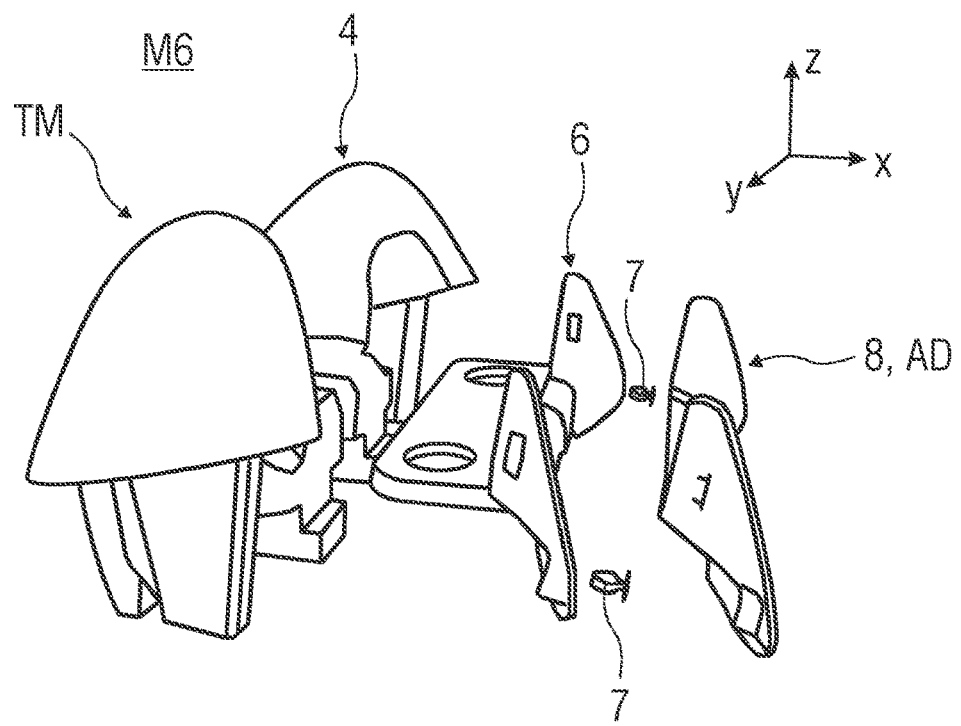
FIG. 5A is a schematic perspective exploded illustration of the carrier module in one of different assembly steps.
Figure 5B:
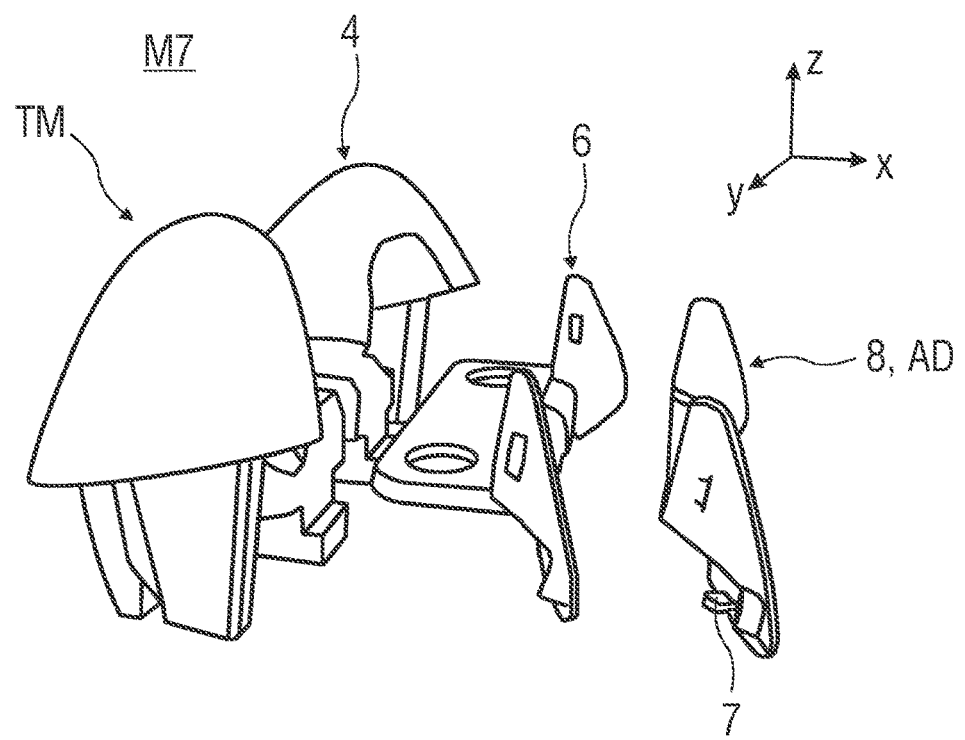
FIG. 5B is a schematic perspective exploded illustration of the carrier module in another of different assembly steps.
Figure 5C:
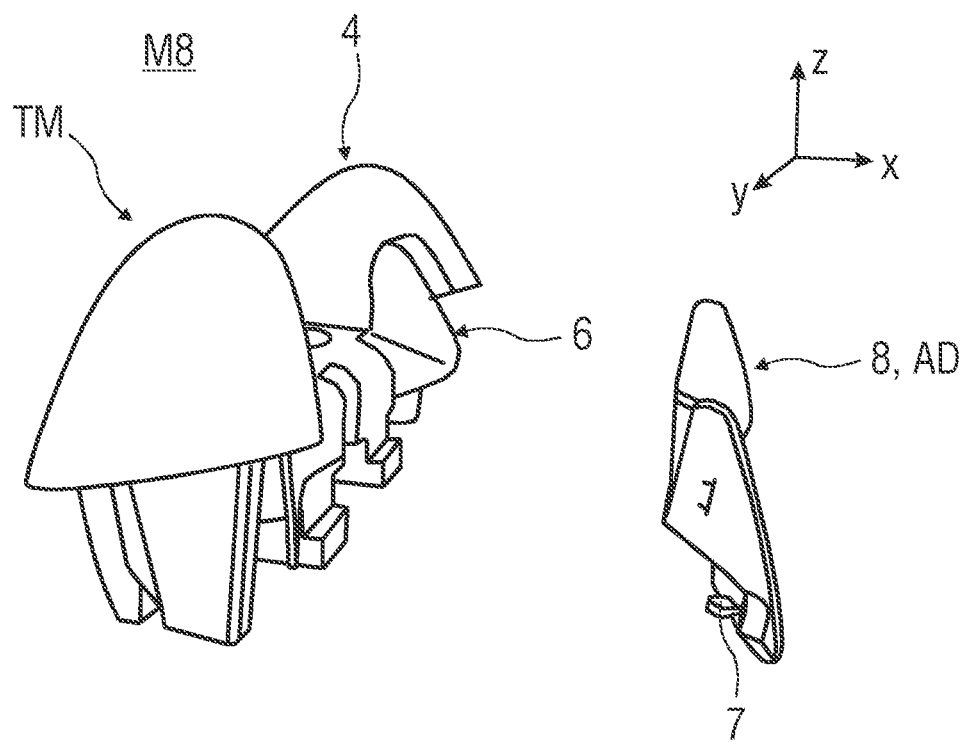
FIG. 5C is a schematic perspective exploded illustration of the carrier module in another of different assembly steps.
Figure 5D:
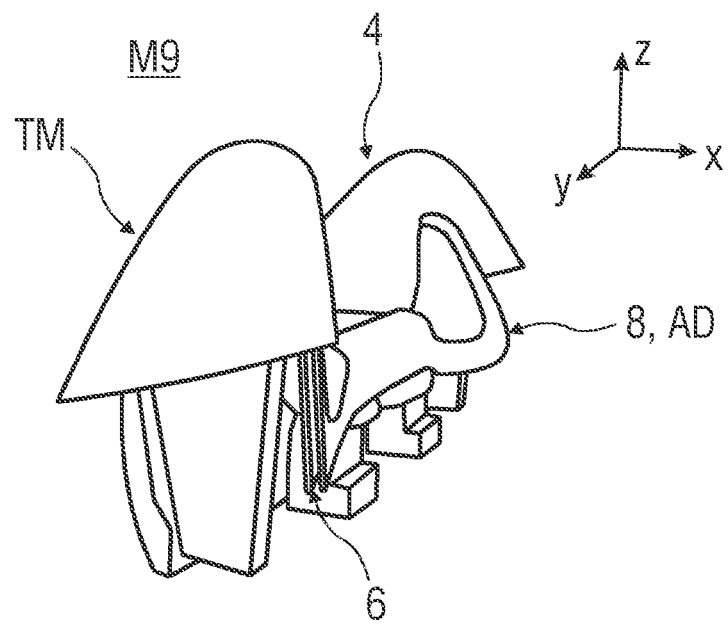
FIG. 5D is a schematic perspective exploded illustration of the carrier module in another of different assembly steps.

FIG. 4 schematically shows an exploded illustration of the carrier module TM in a perspective illustration. The carrier element 4 comprises the receiving space 4.2 for receiving the headrest 2. The carrier element 4 further comprises a fixing structure 4.6. The fixing structure 4.6 projects towards into the receiving space 4.2 of the carrier element 4. The fixing structure 4.6 is adapted to detachably fasten the supporting element 6 to the carrier element 4. In more detail, the fixing structure 4.6 comprises a protruding fixing contour 4.7. The supporting element 6 comprises a corresponding protruding fixing edge 6.4. The fixing contour 4.7 and the fixing edge 6.4 are configured to clamp and tension a trim cover 10, e.g. soft material, e.g. a fabric, leather, textile, against an underside of the protruding fixing contour 4.7. Furthermore, the supporting element 6 may be additionally detachably fasten to the carrier element 4. The carrier element 4 comprises, for example, fastening points 4.5 which correspond with fastening elements of the supporting element 6.

FIGS. 5A to 5D show different assembly steps M6 to M9 in a perspective illustration and exploded illustrations of the carrier module TM.

Figure 6A:
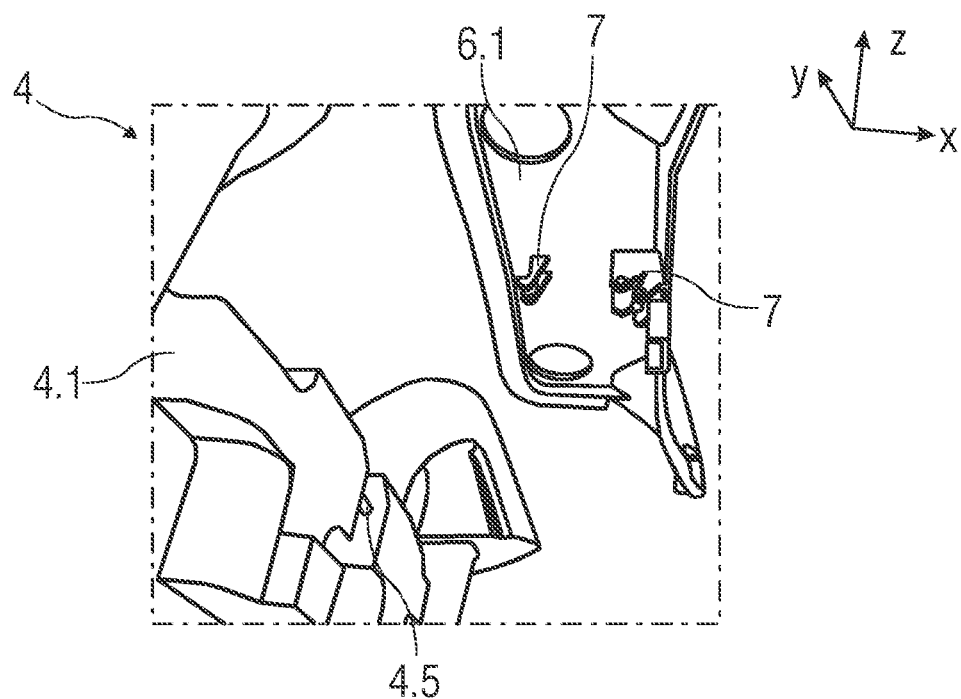
FIG. 6A is a schematic perspective view showing a carrier element and a supporting element in a non-assembled state.
Figure 6B:
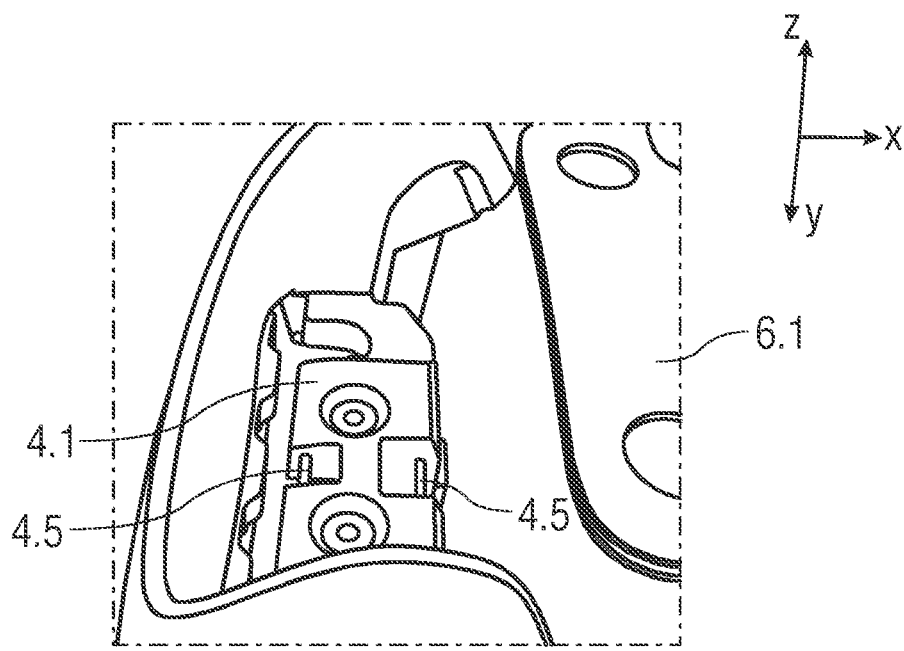
FIG. 6B is a schematic perspective view showing a carrier element and a supporting element in a non-assembled state.

FIGS. 6A and 6B schematically show, in each case in a perspective illustration, a detail of the carrier module TM with the carrier element 4 and the supporting element 6 in a non-assembled state. The supporting element 6 may for example be detachably fastened to the carrier element 4. For this purpose, the supporting element 6 comprises detachable fastening elements 7.

For example, the fastening elements 7 are hook, detent, plug-in and/or clip elements. In particular, the fastening elements 7 are arranged on a surface, facing towards the carrier element 4, of the lower supporting side 6.1. For the engagement, plugging-in, hooking-in and/or clipping-in of the fastening elements 7, the carrier element 4 comprises, for example, fastening points 4.5 which correspond with said fastening elements. In particular, the receiving structure 4.1 comprises the fastening points 4.5. For example, said fastening points 4.5 are plug-in, detent engagement, hook-in and/or clip-in openings.

In the exemplary embodiments illustrated, the fastening points 4.5 are formed by wires arranged on the carrier element 4. For example, the fastening points 4.5 are provided for the mounting and/or hooking-in of the detachable fastening elements 7.

Figure 7:
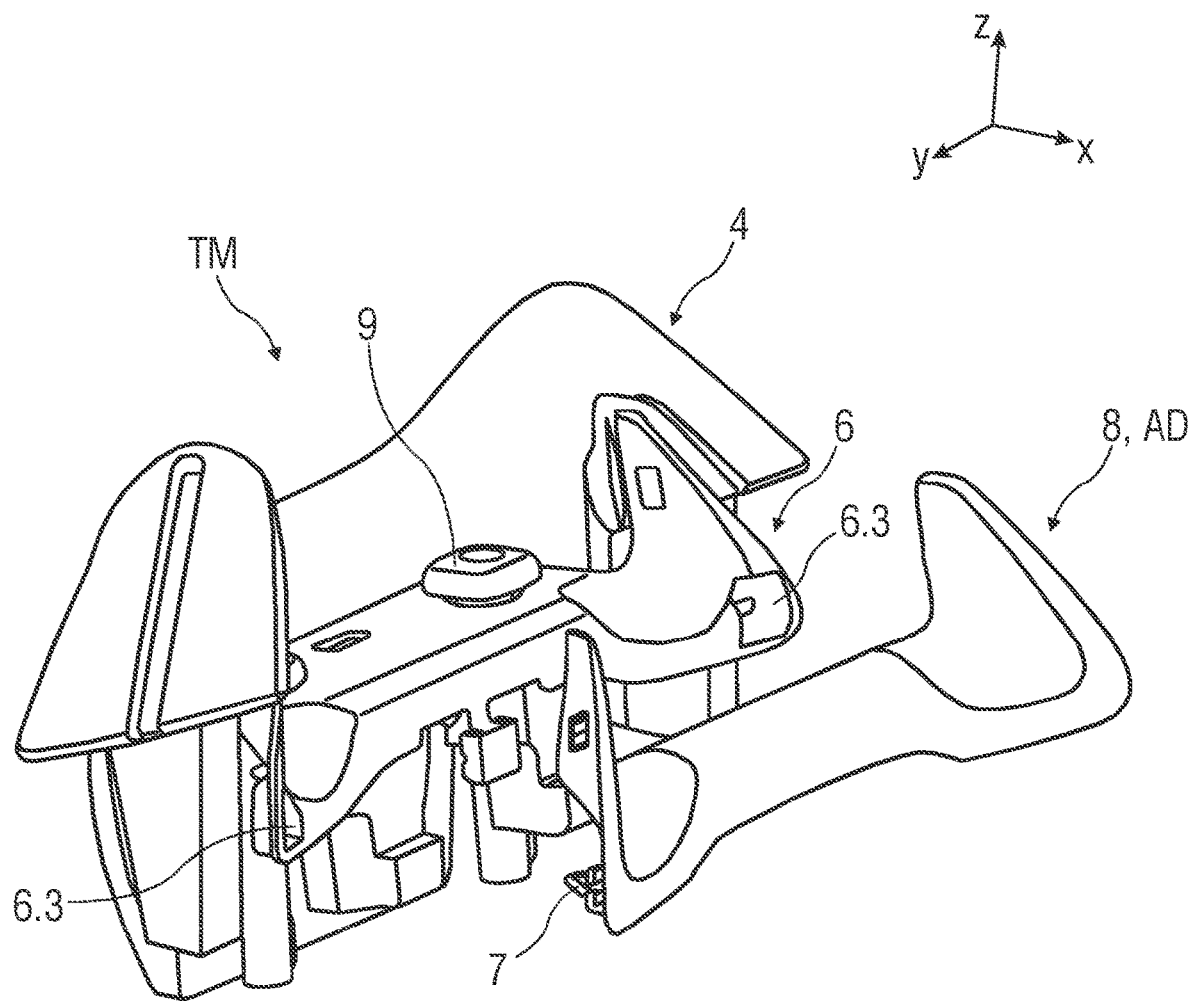
FIG. 7 is a schematic perspective view showing the carrier element, the supporting element and a covering element, wherein the carrier element and the supporting element are in a preassembled state.

FIG. 7 schematically shows the carrier module TM in a perspective illustration, wherein the carrier element 4 and the supporting element 6 are in a preassembled state. The covering element 8 is aligned on the supporting element 6 and/or carrier element 4.

Figure 8:
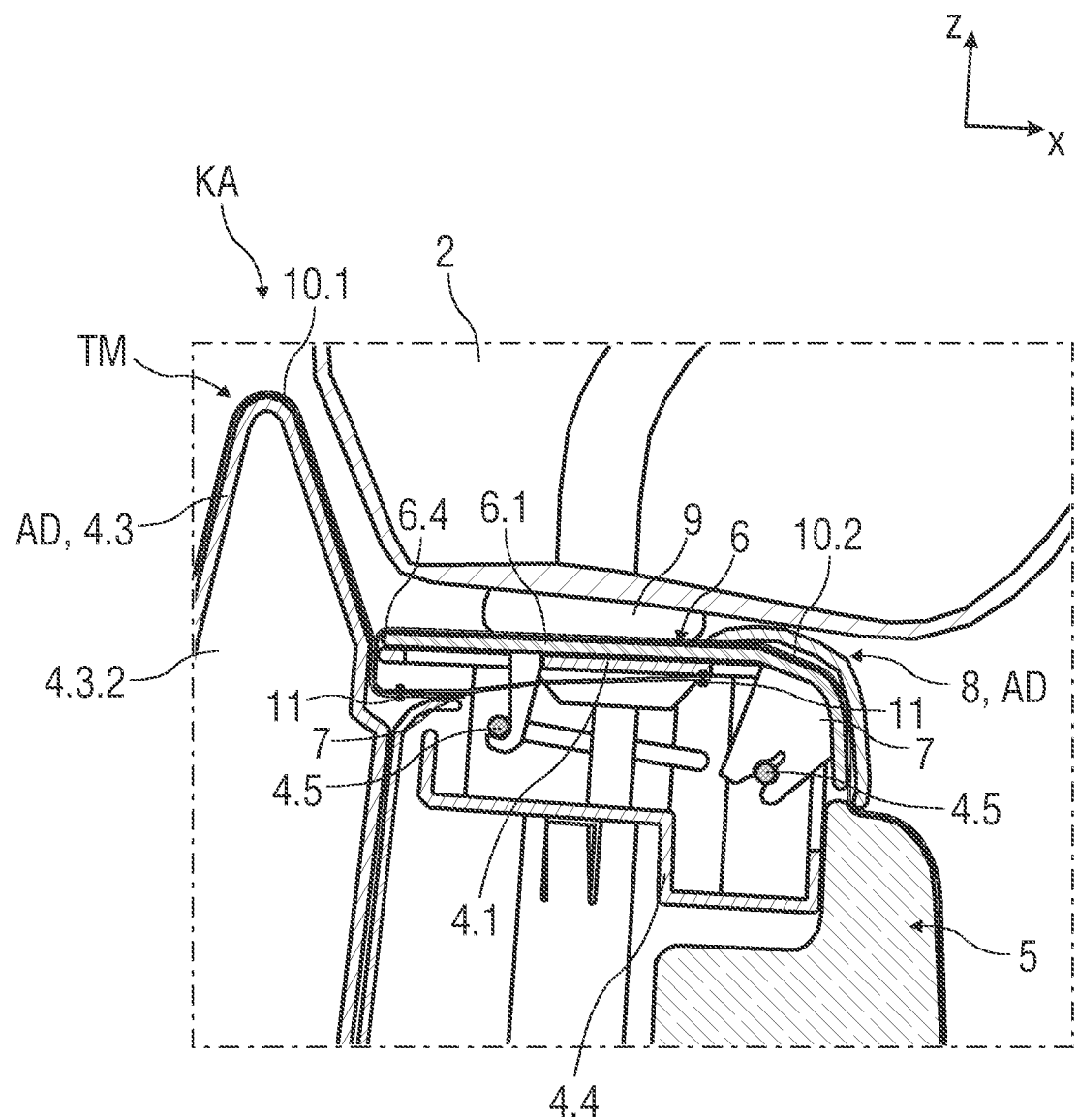
FIG. 8 is a schematic sectional illustration of an exemplary embodiment of the headrest arrangement as per FIG. 2.

FIG. 8 schematically shows a sectional illustration of an exemplary embodiment of the headrest arrangement KA, comprising the headrest 2 and the carrier module TM for receiving the headrest 2. The trim cover 10 may comprises a first trim cover part 10.1 and a second trim cover part 10.2. The first trim cover part 10.1 covers the rear contour region 4.3 of the carrier element 4. The second trim cover part 10.2 covers the cushion element 5 at its front side. The first trim cover part 10.1 and the second trim cover part 10.2 may be fixed to each other, e.g. by a seam 11. The second trim cover part 10.2 may be fixed to an underside of the carrier element 4, e.g. by a seam 11 or a bracket or clamp. The partial fixing contour 4.6 (shown in FIG. 4) and the continuous fixing edge 6.4 are configured to clamp and tension the trim cover parts 10.1, 10.2 against the underside of the protruding fixing contour 4.6 shown in FIG. 4.

While specific embodiments of the invention have been shown and described in detail to illustrate the application of the principles of the invention, it will be understood that the invention may be embodied otherwise without departing from such principles.

LIST OF REFERENCES

1 Backrest
1.1 Seat back structure
1.2 Upper portion
1.3 Receiving opening
2 Headrest
3 Lining
4 Carrier element
4.1 Receiving structure
4.1.1 Receiving opening
4.2 Receiving space
4.2.1 to 4.2.3 Side
4.3 Contour region
4.3.1, 4.3.2 Contour portion
4.4 Extension portion
4.5 Fastening point
4.6 protruding fixing contour
5 Cushion element
5.1 Aperture
6 Supporting element
6.1, 6.2 Supporting side
6.1.1 Opening
6.3 Fastening point
6.4 fixing edge
7 Fastening element
8 Covering element
8.1, 8.2 Covering side
9 Rod sleeve
10 Trim cover
10.1 First trim cover part
10.2 Second trim cover part
Seam
A1, A2 Spacing
AD Covering
B1, B2 Portion region
E1 Receiving structure plane
KA Headrest arrangement
M1 to M9 Assembly step
SZ Seat
TM Carrier module
x Longitudinal axis y Transverse axis
z Vertical axis

What is claimed is:

1. A backrest comprising:
a seat back structure; and
a carrier module for a headrest;
wherein the carrier module comprises:
at least one carrier element arranged on an upper portion of the seat back structure and fixedly connected to the seat back structure, and
at least one supporting element adapted to support the carrier element,
wherein the at least one carrier element comprises:
a receiving space configured to receive the headrest and
a fixing structure projected towards the receiving space and adapted to detachably attach the supporting element to the carrier element, wherein the carrier element comprises a receiving structure having two receiving openings which correspond with receiving openings of the seat back structure and which are configured for receiving headrest rods of the headrest.

2. A backrest according to claim 1, wherein the carrier element comprises a contour region which projects from the receiving structure, the contour region having at least two lateral contour portions.

3. A backrest according to claim 2, wherein the receiving space in which the headrest is insertable is formed between said contour portions.

4. A backrest according to claim 2, wherein at least one covering element is arranged in a region of the receiving space such that the receiving structure is covered.

5. A backrest according to claim 4, wherein the fixing structure comprises a protruding fixing contour and the supporting element comprises a corresponding protruding fixing edge; the fixing contour and the fixing edge are configured to clamp and tension a trim cover against an underside of the protruding fixing contour.

6. A backrest according to claim 2, wherein the at least one supporting element supports the receiving structure and/or the receiving space.

7. A backrest according to claim 6, wherein the carrier element further comprises a contour region which projects from the receiving structure, the contour region comprises contour portions formed so as to be of different heights.

8. A backrest according to claim 7, wherein the contour region further comprises a rear-side contour portion which connects the at least two lateral contour portions to one another.

9. A backrest according to claim 8, wherein the lateral contour portions are configured to taper substantially conically towards one another.

10. A backrest according to claim 4, wherein the at least one covering element comprises two laterally upwardly bent covering sides which correspond with the lateral contour portions.

11. A backrest according to claim 10, wherein the at least one covering element is detachably fastened to the carrier element.

12. A backrest according to claim 1, wherein the carrier element is formed from plastic, in particular polypropylene, and in particular as an injection-molded part.

13. A seat comprising:
at least one backrest comprising:
a seat back structure; and
a carrier module for a headrest,
wherein the carrier module comprises:
at least one carrier element arranged on an upper portion of the seat back structure and fixedly connected to the seat back structure, and
at least one supporting element adapted to support the carrier element,
wherein the at least one carrier element comprises:
a receiving space configured to receive the head rest and
a fixing structure projected towards into the receiving space and adapted to detachably attach the supporting element to the carrier element wherein the carrier element comprises a receiving structure having two receiving openings which correspond with receiving openings of the seat back structure and which are configured for receiving headrest rods of the headrest.

14. A seat according to claim 13, wherein the carrier element is arranged on an upper portion of the seat back structure and fixedly connected to the seat back structure.

15. A seat according to claim 13, wherein the carrier element comprises a contour region which projects from the receiving structure, the contour region having at least two lateral contour portions; and a receiving space formed between said contour portions and in which the headrest is insertable.

16. A seat according to claim 13, wherein at least one covering element is arranged in a region of the receiving space such that the receiving structure is covered.

17. A seat according to claim 16, wherein the fixing structure comprises a protruding fixing contour and the supporting element comprises a corresponding protruding fixing edge; the fixing contour and the fixing edge are configured to clamp and tension the covering element against an underside of the protruding fixing contour.

18. A seat according to claim 13, the backrest further comprises the at least one supporting element associated with the carrier element, the at least one supporting element supporting the receiving structure and/or the receiving space.

19. A seat according to claim 13, wherein the carrier element further comprises a contour region which projects from the receiving structure, the contour region comprises contour portions formed so as to be of different heights.

20. A seat according to claim 19, wherein the contour region further comprises a rear-side contour portion which connects the lateral contour portions to one another.

21. A seat according to claim 19, wherein the lateral contour portions are configured to taper substantially conically towards one another.

22. A seat according to claim 16, wherein the covering element comprises two laterally upwardly bent covering sides which correspond with the lateral contour portions.

23. A seat according to claim 16, wherein the covering element is detachably fastened to the carrier element.

24. A seat according to claim 13, wherein the carrier element is formed from plastic, in particular polypropylene, and in particular as an injection-molded part.

* * * * *

UNITED STATES PATENT AND TRADEMARK OFFICE
CERTIFICATE OF CORRECTION

PATENT NO. : 11,254,249 B2  
APPLICATION NO. : 17/179518  
DATED : February 22, 2022  
INVENTOR(S) : Jörg Haubrich et al.

Page 1 of 1

It is certified that error appears in the above-identified patent and that said Letters Patent is hereby corrected as shown below:

In the Claims

Claim 13, Column 14, Line 13 should read:  
a fixing structure projected towards the receiving Claim 13, Column 14, Line 15 should read:  
element to the carrier element; wherein the carrier Signed and Sealed this  
Nineteenth Day of April, 2022

Katherine Kelly Vidal  
*Director of the United States Patent and Trademark Office*